United States
Tsuji et al.

[11] 4,178,076
[45] Dec. 11, 1979

[54] MACRO ZOOM LENS

[75] Inventors: Sadahiko Tsuji, Yokohama; Yujiro Agari, Tokyo, both of Japan

[73] Assignee: Canon Kabushiki Kaisha, Tokyo, Japan

[21] Appl. No.: 903,174

[22] Filed: May 5, 1978

Related U.S. Application Data

[60] Division of Ser. No. 857,692, Dec. 5, 1977, Pat. No. 4,113,355, which is a continuation of Ser. No. 585,654, Jun. 10, 1975, abandoned.

[30] Foreign Application Priority Data

Jun. 17, 1974 [JP] Japan .................... 49-68883

[51] Int. Cl.² .............................................. G02B 15/18
[52] U.S. Cl. ................................................. 350/184
[58] Field of Search ................... 350/184, 186, 187

[56] References Cited

U.S. PATENT DOCUMENTS 3,884,555  5/1975  Suwa et al. ............... 350/184 X

Primary Examiner—Paul A. Sacher
Attorney, Agent, or Firm—Toren, McGeady and Stanger

[57] ABSTRACT

The present invention relates to a macro zoom lens capable of taking a close up photograph at the one end at which a wide lens effect is obtained and at the other end at which a telephoto lens effect is obtained. One or two groups of the movable lenses in the zoom lens move in a movable direction along the optical axis at the one end at which a wide lens effect is obtained. At the other end, a telephoto lens effect is obtained. The distance between each lens and its next lens in the zoom lens in the ordinary zooming state is small as compared with the distance between the corresponding lenses at the time of taking a close up photograph.

6 Claims, 4 Drawing Figures

MACRO ZOOM LENS

This is a division of application Ser. No. 857,692, now U.S. Pat. No. 4,113,355, filed Dec. 5, 1977, which is a continuation of application Ser. No. 585,654, filed June 10, 1975, now abandoned.

FIELD OF THE INVENTION

The present invention relates to a macro zoom lens capable of taking a close up photograph at the one end at which a wide lens effect is obtained and at the other end at which a telephoto lens effect is obtained, in the zoom lens.

DISCLOSURE OF PRIOR ART

Generally speaking, in a zooming focussing system in which no translation of the focal plane takes place over the zooming range, the first group of the focusing lenses is moved forward along the optical axis. In the case of such focussing system of a zoom lens, it is necessary to strengthen the power of the first group extremely in order to make the nearest focusing distance small so as to take photographs in the so called macro range. Accordingly, it is very difficult to compensate the aberration in the case of a high magnification zoom lens or a large diameter zoom lens. It is however necessary to make the amount of the movement of the first group extremely large in order to make the nearest focussing distance small, for taking photographs in the so called macro range without strengthening the power of the first group so that the diameter of the front lens has to be excessively large. As a consequence, it has been suggested to divide the first group into two sub-groups in order to make the nearest focussing distance small, thus somewhat avoiding the increase of the diameter. In this approach, the number of lenses with largest diameter in the first group is increased so that the cost and the weight is unavoidably increased.

What has been called a macro zoom lens until now, is designed so as to make it possible to take a close up photograph by moving either lens group following the first lens group from the normal position for taking a standard photograph. In other words, close up photography is made possible by moving either lens group following the first lens group forwards and backwards along the optical axis within the dead space at each zooming position in the case of the single macro zoom lens only at the end at which a wide lens effect is obtained. Further, what is called all range macro zoom lens is designed so as to make it possible to take a close up photograph all over the zooming range by moving the lens groups, except for the variator lens, principally by varying magnification from the normal position by a certain determined amount along the optical axis and then, in this stage, moving the variator lens forwards and backwards.

The system according to which the zooming is possible while the focussing plane is not translated in the zoom lens in taking a macro photograph is the system in which the first group is divided. However, this system is not advantageous in view of the cost and weight as mentioned above, so that as the next best system, the system capable of taking a macro photograph all over the zooming range has been more frequently adopted although the focussing plane is unavoidably translated. In this system, it is necessary that the variator lens moves all over the zooming range. It is possible to devise a system according to which the compensator is provided after the variation lens and the focussing plane is kept constant during the zooming operation, and is moved by a certain determined amount. Another system may be devised according to which all or a part of the fixed relay lenses for forming image is moved. Not only does the moving mechanism become complicated but also the precision is lowered when all the relay lenses are moved. Further, if the compensator is moved, it is necessary to choose the amount of the movement at the time of taking a macro photograph large sufficiently in advance in order to avoid the mechanical interference of the minimum air distance between each lens and the next lens.

The purposes of the macro photography are as follows:
(1) to take a photograph from a short distance.
(2) to obtain a high magnification factor, when the distance of the object to be photographed is large.

With reference to (1), an title of an 8 mm motion picture is one example. It is convenient, if the distance of the object to be photographed is small, while the magnification factor is not so large. For this purpose, the wide macro lens is suited.

With reference to (2), the photograph of living things such as insects is one example. It is desirable, in this case, that the distance from the object to be photographed be large and the magnification factor increased. For this purpose, the telemacro lens is suited. Although the macro photography in the intermediate zooming zone is also advantageous, generally the macro photography at both ends is in most cases sufficient. In the latter instance, the macro photographic mechanism is less complicated.

SUMMARY OF THE INVENTION

The first purpose of the present invention is to provide a macro zoom lens capable of taking a macro photograph at the zooming end at which the telephoto lens effect is obtained also at the other end at which the wide lens effect is obtained.

The second purpose of the present invention is to provide a macro zoom system in which it is not necessary to provide a spare space in advance of taking the macro photography between each lens group and the next lens group for zooming the object to be photographed in the normal photographic range in which the focussing can be made by means of the focussing lens.

The third purpose of the present invention is to provide a macro zoom lens system in which it is not necessary to provide, in advance, the minimum air distance between the compensator and the next lens group large as has previously been effected when the compensator is moved and not the relay lens.

According to the present invention when one or two lens groups before the last fixed lens group after the second lens group are moved from the normal position in the movable space between the movable lens group relating to the zooming and the next lens group at the one end at which the wide lens effect is obtained and at the other end at which the telephoto lens effect is obtained, all of the lens groups are moved along a direction in which the distance of the object to be photographed is made small. This is done so that it becomes possible to take a macro photograph at both ends without providing spare moving spaces, and so that the close up effect as well as the enlarging effect, which are the original purposes of the macro zoom system, can be obtained.

The zoom lens of the macro zoom lens in accordance with the present invention is an ordinary zoom lens consisting of the focussing lens group (I), the variator lens group (II), the compensator lens group (III) and the basic lens group (IV). In this zoom lens, when the distance between the above mentioned group I and group II is $e_1$, the distance between the group II and group III is $e_2$, and the distance between the group III and group IV, $e_3$, and when the minimum value of the distance between the group I and that II in the ordinary zooming is $e_1$ min, the minimum value of the distance between the group II and group III, $e_2$ min, and the minimum value of the distance between the group III and group IV, $e_3$ min and, when the distance between the group I and group II in the macro state is $e_1$ macro, the distance between the group II and group III, $e_2$ macro, and the distance between the group III and group IV, $e_3$ macro, the following relations are obtained:

$e_1$ min $\leq e_1$ macro $e_2$ min $\leq e_2$ macro $e_3$ min $\leq e_3$ macro Cam grooves are provided at both ends of the cam ring and the cam grooves for zooming as a mechanism for moving the movable lens group.

Further, other purposes and features of the present invention will be disclosed in the explanations below.

DETAILED DESCRIPTION OF THE PREFERRED EMBODIMENT

Figure 1:
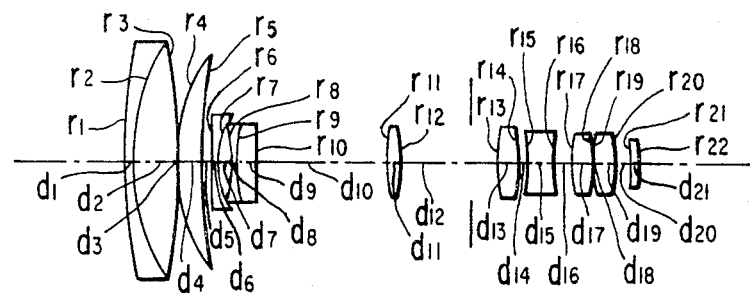
FIG. 1 shows a basic zoom lens for explaining an embodiment of the present invention.

FIG. 1 shows a zoom lens for explaining an embodiment of the present invention. A numerical example of the dimensions of the zoom lens shown in FIG. 1 is as follows:
- R: Radius of curvature of the refraction plane (counted from the side near to the object to be photographed)
- d: Thickness or air distance between the refraction planes (counted from the side near to the object to be photographed)
- N: Refractive index of the glass (d-line) (counted from the side near to the object to be photographed)
- V: Abbe's number of the glass (d-line) (counted from the side near to the object to be photographed)
- F: Focal length of the total system
- f: Focal length of the lens group (counted from the side near to the object to be photographed)
- l: Distance between the lens groups (counted from the side near to the object to be photographed)

$F = 9.2013617 - 20.058969 - 43.728529$

F-number = 1.8

| | | |
|---|---|---|
| $R_1 = 96.11$ | | |
| $d_1 = 1.4$ | $N_1 = 1.80518$ | $V_1 = 25.40$ |
| $R_2 = 39.46$ | | |
| $d_2 = 7.3$ | $N_2 = 1.58913$ | $V_2 = 61.10$ |
| $R_3 = -112.5$ | | |
| $d_3 = 0.1$ | | |
| $R_4 = 30.84$ | | |
| $d_4 = 4.5$ | $N_3 = 1.58913$ | $V_3 = 61.10$ |
| $R_5 = 109.18112$ | | |
| $d_5 = l_1$ | | |
| $R_6 = 304.2$ | | |
| $d_6 = 0.9$ | $N_4 = 1.62299$ | $V_4 = 58.20$ |
| $R_7 = 13.14$ | | |
| $d_7 = 2.7$ | | |
| $R_8 = -18.72$ | | |
| $d_8 = 0.9$ | $N_5 = 1.69350$ | $V_5 = 53.3$ |
| $R_9 = 14.89$ | | |
| $d_9 = 2.5$ | $N_6 = 1.80518$ | $V_6 = 25.4$ |
| $R_{10} = 195.66023$ | | |
| $d_{10} = l_2$ | | |
| $R_{11} = 74.09$ | | |
| $d_{11} = 1.7$ | $N_7 = 1.58913$ | $V_7 = 61.1$ |
| $R_{12} = -39.75386$ | | |
| $d_{12} = l_3$ | | |
| $R_{13} = 13.2$ | | |
| $d_{13} = 3.3$ | $N_8 = 1.69350$ | $V_8 = 53.3$ |
| $R_{14} = 88.5$ | | |
| $d_{14} = 1.5$ | | |
| $R_{15} = -20.0$ | | |
| $d_{15} = 4.9$ | $N_9 = 1.80518$ | $V_9 = 25.4$ |
| $R_{16} = 33.0$ | | |
| $d_{16} = 3.7$ | | |
| $R_{17} = 480.0$ | | |
| $d_{17} = 3.2$ | $N_{10} = 1.69350$ | $V_{10} = 53.3$ |
| $R_{18} = -19.1$ | | |
| $d_{18} = 0.1$ | | |
| $R_{19} = 18.4$ | | |
| $d_{19} = 3.2$ | $N_{11} = 1.69350$ | $V_{11} = 53.3$ |
| $R_{20} = -38.6$ | | |
| $d_{20} = 3.3$ | | |
| $R_{21} = -13.9$ | | |
| $d_{21} = 0.8$ | $N_{12} = 1.78472$ | $V_{12} = 25.7$ |
| $R_{22} = -33.89101$ | | |

| F | 9.2013617 | 20.058969 | 43.728529 |
|---|---|---|---|
| $l_1$ | 1.3779 | 15.5379 | 22.0333 |
| $l_2$ | 22.6494 | 16.1540 | 1.9940 |
| $l_3$ | 16.6646 | 9.0000 | 16.6646 |

$f_1 = 45.66$
$f_2 = -12.00$
$f_3 = 44.16$
$f_4 = 19.40$

In the case of the zoom lens shown in FIG. 1, the lens group I consisting of surfaces, $r_1-r_5$ is a focussing lens of positive refraction with focal length $f_1$, the lens group II consisting of surfaces $r_6-r_{10}$ a variator lens of negative refraction with focal length $f_2$, the lens group III consisting of surfaces $r_{11}-r_{12}$ a compensator lens of positive refraction with focal length $f_3$ and the lens group IV consisting of surfaces $r_{13}-r_{22}$, a relay lens of positive refraction with focal length $f_4$.

Figure 2:
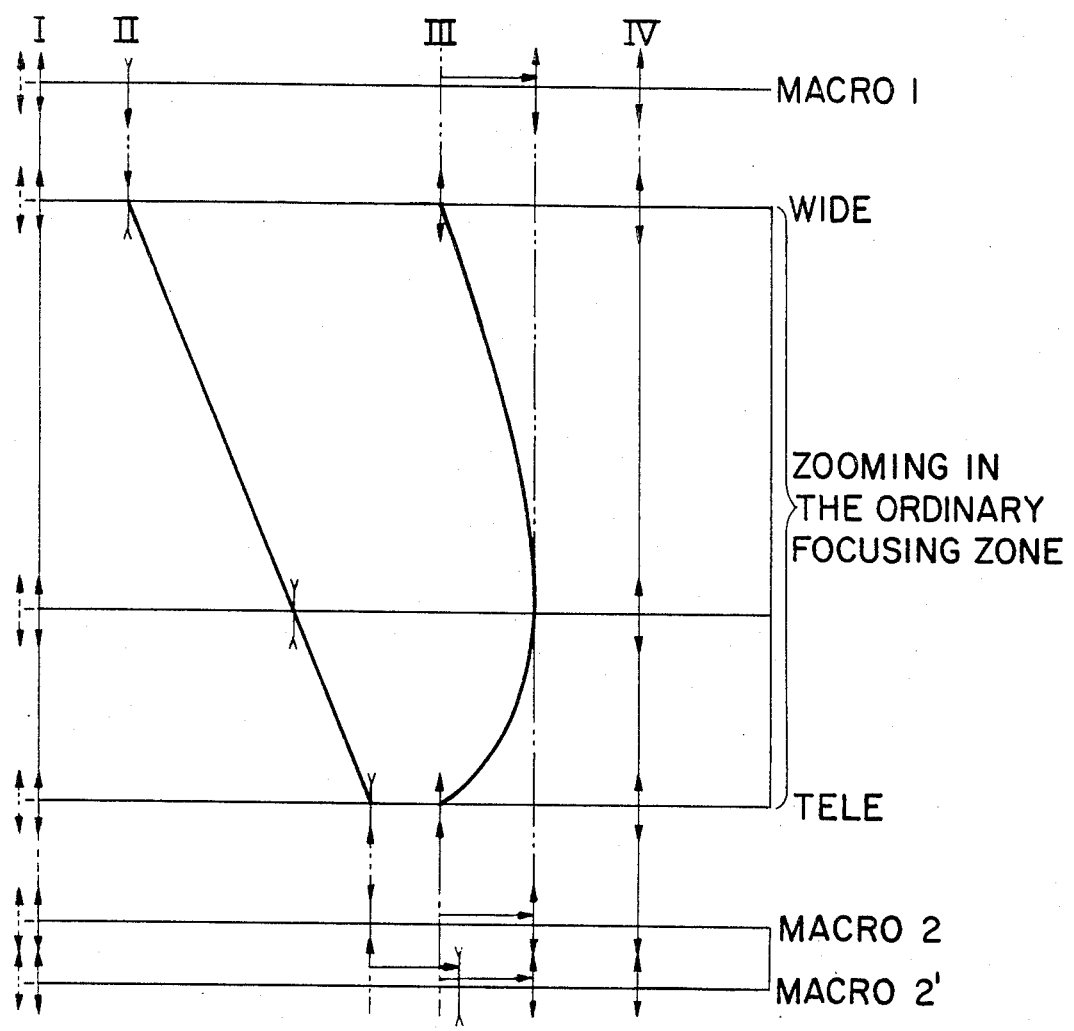
FIG. 2 shows a diagram for explaining the macro zooming lens in accordance with the present invention, according to the zoom lens shown in FIG. 1.

FIG. 2 shows a diagram for explaining the macro zoom using the zoom lens shown in FIG. 1.

In the case of zooming in the ordinary focussing range, the lens group II makes a straight line movement while the lens group III makes a non-linear to and fro movement, with the movement convex toward the image side in such a manner that the lens group I and the lens group II are nearest to each other at the end at which the wide lens effect is obtained, the lens group II and the lens group III are nearest to each other at the end at which the telephoto lens effect is obtained and the lens group III and the lens group IV are nearest to each other at a medium focal length. If the shortest distance is the minimum distance due to the mechanical interference, at the end at which the wide lens effect is obtained, the lens group II presents a space movable only toward the image side while the lens group III presents a space movable toward both the object side and the image side. Thus, it is only when the lens group III moves toward the image side, that the distance of the object to be photographed can be made small even if the lens group are moved into the movable spaces. This is called macro 1. Further at the end at which the telephoto lens effect is obtained, the lens group II presents a space movable to the object side while the lens group III presents a space movable toward the image side. Also in this case, it is when the lens group III is moved toward the image side that the distance of the object to be photographed can be made small. This is called macro 2. In this state (macro 2) between the lens group II and the lens group III, a new movable space takes place. By moving the lens group II into the space, namely by moving both of the lens groups II and III toward the image side, the macro effect can be further increased as compared with the case of macro 2. This is called macro 2'. Although it is usual to advance the lens group I toward the object side for the ordinary zooming, if at the time of taking a macro photograph, the lens group I is advanced from the position at which the lens group I is most retired, namely, from the position at which the focal length is infinite, it can be expected that the macro effect can be made large at the end at which the telephoto lens effect is obtained. In the present embodiment, with the macro zoom lens at both ends, a combination of macro 1 and macro 2 is most effective.

Numerical examples for macro 1, macro 2 and macro 2' are given below. S is the distance between the first lens group and the object to be photographed while $\beta$ is the magnification factor.

|  | macro 1 | | macro 2 | |
| --- | --- | --- | --- | --- |
|  | Front lens | Front lens advanced 1.5mm | Front lens | Front lens advanced 1.5mm |
| $l_1$ | 7.5 | 9 | 28.15541 | 29.65541 |
| $l_2$ | 34.32 | 34.32 | 13.66549 | 13.66459 |
| $l_3$ | 9 | 9 | 9 | 9 |
| s | −23.2 | −22.8 | −959.6 | −597.0 |
| $\beta$ | 1/6.22 | 1/6.32 | 1/29.56 | 1/17.83 |

| | macro 2' | |
| --- | --- | --- |
| | Front lens | Front lens advanced 1.5mm |
| $l_1$ | 35.82 | 37.32 |
| $l_2$ | 6 | 6 |
| $l_3$ | 9 | 9 |
| S | −317.67 | −273.15 |
| $\beta$ | 1/6.22 | 1/5.20 |

Figure 3:
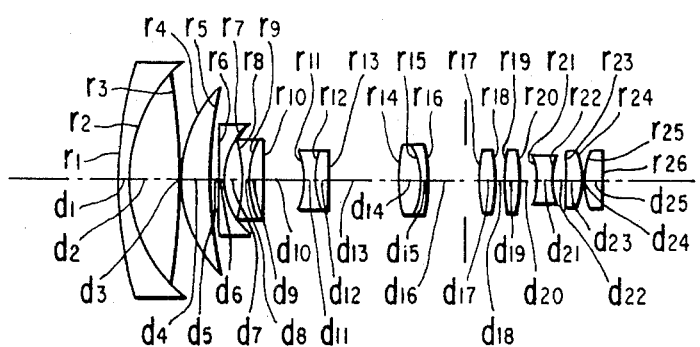
FIG. 3 shows another basic zoom lens for explaining further another embodiment of the present invention.

FIG. 3 shows another basic zoom lens for explaining further another embodiment of the present invention. A numerical example of the dimensions of the zoom lens shown in FIG. 3 is as follows.

$F = 8.5000008 - 15.989001 - 40.502194$

F-number = 1.8

| | | |
| --- | --- | --- |
| $R_1 = 71.27$ | | |
| $d_1 = 1.5$ | $N_1 = 1.80518$ | $V_1 = 25.2$ |
| $R_2 = 26.71$ | | |
| $d_2 = 9.0$ | $N_2 = 1.67790$ | $V_2 = 55.3$ |
| $R_3 = -132.8$ | | |
| $d_3 = 0.1$ | | |
| $R_4 = 24.0$ | | |
| $d_4 = 5.5$ | $N_1 = 1.07$ | $V_3 = 57.4$ |
| $R_5 = 88.80826$ | | |
| $d_5 = l_1$ | | |
| $R_6 = 1089.0$ | | |
| $d_6 = 9$ | $N_4 = 1.6935$ | $V_4 = 53.3$ |
| $R_7 = 11.08$ | | |
| $d_7 = 2.9$ | | |
| $R_8 = 37.68$ | | |
| $d_8 = 0.9$ | $N_5 = 1.6935$ | $V_5 = 53.3$ |
| $R_9 = 17.22$ | | |
| $d_9 = 2.3$ | $N_6 = 1.80518$ | $V_6 = 25.4$ |
| $R_{10} = 139.25799$ | | |
| $d_{10} = l_2$ | | |
| $R_{11} = -15.74$ | | |
| $d_{11} = 2.0$ | $N_7 = 1.65844$ | $V_7 = 50.9$ |
| $R_{12} = 17.02$ | | |
| $d_{12} = 2.0$ | $N_8 = 1.80518$ | $V_8 = 25.2$ |
| $R_{13} = 119.77414$ | | |
| $d_{13} = l_3$ | | |
| $R_{14} = 34.95$ | | |
| $d_{14} = 3.5$ | $N_9 = 1.66672$ | $V_9 = 48.3$ |
| $R_{15} = -12.18$ | | |
| $d_{15} = 0.8$ | $N_{10} = 1.7552$ | $V_{10} = 27.5$ |
| $R_{16} = -34.65409$ | | |
| $d_{16} = l_4$ | | |
| $R_{17} = 26.57$ | | |
| $d_{17} = 2.9$ | $N_{11} = 1.66672$ | $V_{11} = 48.3$ |
| $R_{18} = 376.2$ | | |
| $d_{18} = 1.5$ | | |
| $R_{19} = 17.98$ | | |
| $d_{19} = 2.6$ | $N_{12} = 1.66672$ | $V_{12} = 48.3$ |
| $R_{20} = 67.78$ | | |
| $d_{20} = 3.0$ | | |
| $R_{21} = -21.42$ | | |
| $d_{21} = 3.0$ | $N_{13} = 1.80518$ | $V_{13} = 25.4$ |
| $R_{22} = 16.76$ | | |
| $d_{22} = 2.0$ | | |
| $R_{23} = 79.31$ | | |
| $d_{23} = 3.0$ | $N_{14} = 1.62299$ | $V_{14} = 58.2$ |
| $R_{24} = -14.12$ | | |
| $d_{24} = 0.1$ | | |
| $R_{25} = 12.96$ | | |
| $d_{25} = 2.6$ | $N_{15} = 1.62299$ | $V_{15} = 58.2$ |
| $R_{26} = 44.08348$ | | |

| F | 8.000000 | 15.989001 | 40.502194 |
| --- | --- | --- | --- |
| $l_1$ | 0.8827 | 7.2859 | 12.6563 |
| $l_2$ | 7.0833 | 2.0313 | 5.1116 |
| $l_3$ | 12.4030 | 11.0524 | 2.6017 |
| $l_4$ | 9.0000 | 9.0000 | 9.0000 |

$f_1 = 31.40780$
$f_2 = -12.00000$
$f_3 = -24.94920$
$f_4 = 30.39297$
$f_5 = 19.65985$

In the case of the zoom lens shown in FIG. 3, the lens group I' consisting of the surfaces $r_1-r_5$ is a focussing lens of the positive refraction with the focal length $f_1$, the lens group II' consisting of the surfaces $r_6-r_{10}$ is a variator lens of the negative refraction with the focal length $f_2$, the lens group III' consisting of the surfaces $r_{11}-r_{13}$ is a compensator lens of the negative refraction with the focal length $f_3$, the lens group IV' consisting of the surfaces $r_{14}-r_{16}$ is the relay lens of the positive refraction with the positive refraction with the focal length $f_4$ and the lens group V' consisting of the surfaces $r_{17}$–$r_{26}$ is a relay lens of the positive refraction with the focal length $f_5$.

Figure 4:
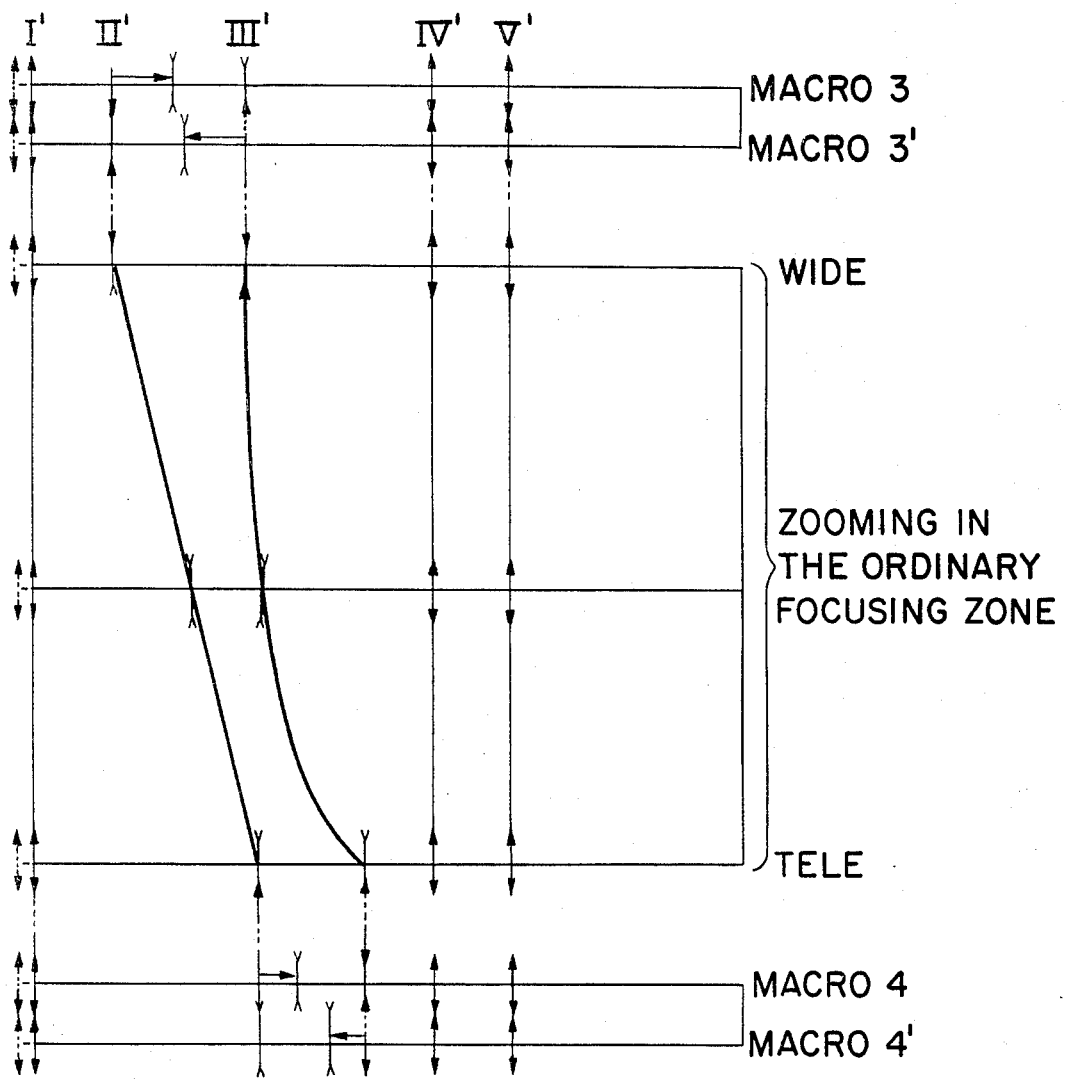
FIG. 4 shows a diagram for explaining the macro zooming lens in accordance with the present invention, according to the zoom lens shown in FIG. 3.

FIG. 4 shows a diagram for explaining the macro system lens using the zoom lens shown in FIG. 3. In the case of the zooming in the ordinary focussing range, the lens group I' and the lens group II' are nearest to each other at the end at which the wide lens effect is obtained, the lens group II' and the lens group III' are nearest to each other at the medium focal length and the lens group III' and the lens group IV' are the nearest to each other at the end at which the telephoto lens effect is obtained. Thus the distances can not be made smaller due to the mechanical interference. The lens groups IV' and V' are secured with a certain determined distance between them.

In the above mentioned construction, at the end at which the wide lens effect is obtained, the lens group II' presents a space movable only toward the image side, the lens group III' presents a space movable toward both the object side and the image side and the lens group IV' presents a space movable only toward the object side, whereby it is when the lens group II' is moved toward the image side (this is called macro 3) and when the lens group III' is moved toward the object side that the distance of the object to be photographed can be made small. Further, it is also possible to make the distance of the object to be photographed small when the lens group II' is moved a little backwards while at the same time, the lens group III' is moved forwards whereby this presents an intermediary character between macro 3 and macro 3', so that this can be represented by either one.

At the end at which the telephoto lens effect is obtained, the lens group II' presents a space movable toward both the object side and the image side, the lens group III' presents a space movable only toward the object side and the lens group IV' presents no movable space. Although the lens group IV' can present a movable space when the lens groups IV' and III' are moved forwards at the same time, the macro effect is small. Here, when the lens group II' is moved toward the image side (macro 4) and when the lens group III' is moved toward the object side (macro 4'), the distance of the object to be photographed can be made small.

Also, in this case, the macro effect can be increased by moving the lens group I' forwards. In the case of the present embodiment, the combination of macro 3' and macro 4 is most effective.

The numerical figures of the macro 3, 3', 4 and 4' are as follows.

|  | macro 3 | | macro 3' | |
|---|---|---|---|---|
|  | Front lens | Front lens advanced 1 mm | Front lens | Front lens advanced 1 mm |
| $l_1$ | 12.552 | 13.552 | 7.5 | 8.5 |
| $l_2$ | 6 | 6 | 6 | 6 |
| $l_3$ | 15.8019 | 15.8019 | 20.8539 | 20.8539 |
| $l_4$ | 6.5 | 6.5 | 6.5 | 6.5 |
| S | −670.63 | −419.29 | −16.95 | −16.74 |
| β | 1 | 1 | 1 | 1 |
|  | 53.04 | 32.19 | 5.41 | 5.49 |

|  | macro 4 | | macro 4' | |
|---|---|---|---|---|
|  | Front lens | Front lens advanced 1 mm | Front lens | Front lens advanced 1 mm |
| $l_1$ | 22.3339 | 23.3339 | 19.2736 | 20.2736 |
| $l_2$ | 6 | 6 | 6 | 6 |
| $l_3$ | 6 | 6 | 9.0803 | 9.0803 |
| $l_4$ | 6.5 | 6.5 | 6.5 | 6.5 |
| S | −351.69 | −273.19 | −1028.96 | −527.39 |
| β | 1 | 1 | 1 | 1 |
|  | 7.89 | 5.95 | 31.53 | 15.68 |

What is claimed is:

1. A macro zoom lens capable of taking close-up photography, at the edge of the wide and tele-side of the zooming zone, comprising:

focusing means, zooming means, and fixed image forming means arranged in the written order from an object side, said focusing means for focusing at an ordinary photographing distance, said zooming means including a first movable member and a second movable member, said fixed image forming means for focusing a light flux from said zooming means on a film;

at least one of said first movable member and second movable member being movable at the time of close-up photography;

said first and second movable members being within a zooming space during close-up photography in which said first and second movable members move at the time of zooming;

said first and second movable members being positioned at a position in said zooming space at the time of a close-up photograph from the wide edge and being positioned at a different position in said zooming space at the time of close-up photography from the tele-edge;

wherein the distance between said focusing means and the image forming means being substantially constant both at the time of close-up photography and at the time of photography at an ordinary distance, the distance ($e_1$) between the focusing means and the first movable member, the distance ($e_2$) between the first movable member and the second movable member, and the distance ($e_3$) between the second movable member and the image forming means satisfy the following conditions:

$$e_1 \min \leq e_1 \text{macro}$$

$$e_2 \min \leq e_2 \text{macro}$$

$$e_3 \min \leq e_3 \text{macro}$$

in which, $e_1$ min, $e_2$ min and $e_3$ min signify a minimum value of the distance $e_1$, $e_2$, $e_3$ respectively in the zooming state in an ordinary focusing zone, and $e_1$ macro, $e_2$ macro and $e_3$ macro signify a distance $e_1$, $e_2$ and $e_3$ respectively at the time of the close-up photography and wherein said focusing means is a focusing lens having positive refraction, said first movable member is a variator lens having negative refraction, said second movable member is a compensator lens having negative refraction and the image forming means is a basic lens having positive refraction.

2. A macro zoom lens according to claim 1, in which said variator lens moves toward the image plane from the lens arrangement of the zoom lens at the wide and tele-ends when close-up photography is performed at the wide and tele-ends, and said compensator lens is not moved when the close-up photography is performed at the wide and tele-ends.

3. A macro zoom lens according to claim 1, in which said variator lens is not moved when the close-up photography is performed at the wide and tele-ends, and said compensator lens moves toward the object from the lens arrangement of the zoom lens at the wide and tele-ends when close-up photography is performed at the wide and tele-ends.

4. A macro zoom lens according to claim 1, in which said variator lens moves toward the image plane from the lens arrangement of the zoom lens at the wide-end, and is not moved at the tele-end when the close-up photography is performed, and said compensator lens is not moved at the wide-end and moves toward the object from the lens arrangement of the zoom lens at the tele-end when the close-up photography is performed.

5. A macro zoom lens according to claim 1, in which said variator lens is not moved at the wide-end and moves toward the image plane from the lens arrangement of the zoom lens at the tele-end when the close-up photography is performed, and the compensator lens moves toward the object from the lens arrangement of the zoom lens at the wide-end and is not moved at the tele-end when the close-up photography is performed.

6. A macro zoom lens capable of taking close-up photography, at the edge of the wide and tele-side of the zooming zone, comprising:

focusing means, zooming means, and fixed image forming means arranged in the written order from an object side, said focusing means for focusing at an ordinary photographing distance, said zooming means including a first movable member and a second movable member, said fixed image forming means for focusing a light flux from said zooming means on a film;

at least one of said first movable member and second movable member being movable at the time of close-up photography;

said first and second movable members being within a zooming space during close-up photography in which said first and second movable members move at the time of zooming;

said first and second movable members being positioned at a position in said zooming space at the time of a close-up photograph from the wide edge and being positioned at a different position in said zooming space at the time of close-up photography from the tele-edge;

wherein the distance between said focusing means and the image forming means being substantially constant both at the time of close-up photography and at the time of photography at an ordinary distance, the distance ($e_1$) between the focusing means and the first movable member, the distance ($e_2$) between the first movable member and the second movable member, and the distance ($e_3$) between the second movable member and the image forming means satisfy the following conditions:

$$e_1 \min \leqq e_1 \text{ macro}$$

$$e_2 \min \leqq e_2 \text{ macro}$$

$$e_3 \min \leqq e_3 \text{ macro}$$

in which, $e_1$ min, $e_2$ min and $e_3$ min signify a minimum value of the distance $e_1$, $e_2$, $e_3$ respectively in the zooming state in an ordinary focusing zone, and $e_1$ macro, $e_2$ macro and $e_3$ macro signify a distance $e_1$, $e_2$ and $e_3$ respectively at the time of the close-up photography and wherein the focusing means is a focusing lens having positive refraction, the first movable member is a variator lens having negative refraction, the second movable member is a compensator lens having a positive refraction and the image forming means is a basic lens having a positive refraction, and the compensator lens moves towards the image plane from the lens arrangement of the zoom lens at the wide and tele-ends when close-up photography is performed at the wide and tele-ends and in which the variator lens is not moved when the close-up photography is performed at the wide-end, and the variator lens moves toward the image plane from the lens arrangement of the zoom lens at the tele-end.

* * * * *